United States Patent
Morris

(10) Patent No.: US 7,832,268 B2
(45) Date of Patent: Nov. 16, 2010

(54) LEVEL SENSOR ARRANGEMENT

(75) Inventor: Adrian Peter Morris, Little Haywood (GB)

(73) Assignee: Synatel Instrumentation Limited (GB)

(*) Notice: Subject to any disclaimer, the term of this patent is extended or adjusted under 35 U.S.C. 154(b) by 333 days.

(21) Appl. No.: 11/505,210

(22) Filed: Aug. 16, 2006

(65) Prior Publication Data

US 2007/0041270 A1    Feb. 22, 2007

(30) Foreign Application Priority Data

Aug. 20, 2005    (GB) ............................. 0517105.3

(51) Int. Cl.
   *G01F 23/22*    (2006.01)

(52) U.S. Cl. .................................. 73/290 R

(58) Field of Classification Search .............. 73/290 R, 73/290 V, 290 B, 1.73, 291; 340/617; 200/61.21; 318/482

See application file for complete search history.

(56) References Cited

U.S. PATENT DOCUMENTS

| | | | |
|---|---|---|---|
| 2,851,553 A * | 9/1958 | Grostick | 200/61.21 |
| 2,909,766 A * | 10/1959 | Bozich | 340/615 |
| 3,296,862 A * | 1/1967 | Ziniuk | 73/290 R |
| 3,400,462 A * | 9/1968 | Pobst, Jr. | 33/715 |
| 3,818,159 A * | 6/1974 | Evans et al. | 200/61.21 |
| 3,941,956 A * | 3/1976 | Delin et al. | 200/61.2 |
| 4,095,064 A * | 6/1978 | Fleckenstein | 200/61.21 |
| 4,147,906 A * | 4/1979 | Levine | 200/61.2 |
| 4,157,036 A * | 6/1979 | Kivenson | 73/290 R |
| 4,211,966 A * | 7/1980 | Sweet | 318/482 |
| 4,318,624 A * | 3/1982 | Jett | 366/349 |
| 4,375,020 A * | 2/1983 | Holterbosch | 200/61.21 |
| 4,392,032 A * | 7/1983 | Roach, II | 200/61.21 |
| 4,510,804 A * | 4/1985 | Byatt et al. | 73/290 V |
| 4,551,663 A | 11/1985 | Gruber | |
| 4,695,685 A * | 9/1987 | Fleckenstein et al. | 200/61.21 |
| 4,827,768 A * | 5/1989 | Tuckey | 73/290 R |
| 4,884,444 A * | 12/1989 | Tuckey | 73/290 R |
| 5,012,589 A * | 5/1991 | Remion | 33/720 |
| 5,164,555 A * | 11/1992 | Brenton | 200/61.21 |
| 6,382,225 B1 * | 5/2002 | Tipton | 137/1 |
| 6,485,013 B2 * | 11/2002 | Slippy et al. | 271/117 |
| 6,485,171 B1 * | 11/2002 | Wang et al. | 366/153.1 |

(Continued)

FOREIGN PATENT DOCUMENTS

EP    0531860    3/1993

(Continued)

OTHER PUBLICATIONS

Connor, K. A., "Lecture 8, Stepper Motors". May 9, 2002. http://hibp.ecse.rpi.edu/~connor/education/IEE/lectures/Lecture_8_Stepper_motors.pdf.*

*Primary Examiner*—John Fitzgerald
(74) *Attorney, Agent, or Firm*—Kajane McManus

(57) ABSTRACT

The level sensor arrangement comprises a paddle directly driven by a stepping or stepper motor to rotate in use unless the paddle is arrested in use by a material level, the arrangement including a sensor to determine paddle rotation and the sensor providing a signal to a controller indicative of paddle rotation.

12 Claims, 3 Drawing Sheets

U.S. PATENT DOCUMENTS

| | | | |
|---|---|---|---|
| 6,696,965 B2 * | 2/2004 | Stout et al. | 340/617 |
| 6,986,294 B2 * | 1/2006 | Fromme et al. | 73/865.8 |
| 2002/0066313 A1 * | 6/2002 | Slippy et al. | 73/290 R |
| 2004/0031335 A1 * | 2/2004 | Fromme et al. | 73/865 |
| 2006/0257999 A1 * | 11/2006 | Chang et al. | 435/289.1 |
| 2007/0041270 A1 * | 2/2007 | Morris | 366/279 |

FOREIGN PATENT DOCUMENTS

| | | |
|---|---|---|
| GB | 1394344 | 5/1975 |
| GB | 2411004 | 8/2005 |

* cited by examiner

LEVEL SENSOR ARRANGEMENT

The present invention relates to level sensor arrangements and more particularly to such arrangement utilised to detect a certain level of material such as grain, sand or viscous fluids in a silo, hopper or other vessel.

It is necessary to detect the level of materials within such vessels as grain silos or slurry tanks. As indicated the products of particular interest are grain, flour, sand, cement, aggregates and all granular solids and powders as wall as some viscous materials so it will be appreciated the level sensors must be relatively robust. It will be understood these material generally enter the vessel as free flowing solids.

Although it is known to use electrical capacitance and proximity type sensors as well as tilt and pressure pad sensing arrangements it will be understood that these may have problems with respect to different presentations of the material and may be dependent upon expected density or weight content or other variable characteristic of the material in order to provide an indication as to the level. A popular approach with regard to level sensing in silos, hoppers and other vessels for granular solids utilises a rotating paddle or propeller to determine material level within these vessels. These prior level sensors depend upon a small electrical motor and gearbox driving a paddle or propeller which may be either horizontally or vertically presented in the storage vessel. The paddle rotates typically at a generally low rate of 1 rpm. The electric motor is fitted on a spring loaded quadrant arm so that when material rises to the level where it interferes with the paddle, the paddle stops. The motor however continues to turn causing the quadrant arm to rotate. As the quadrant arm rotates it moves to one side activating a limit switch which in turn gives a signal indicating that material is present and the trigger level acquired. Further movement of the quadrant arm by the reaction between the propeller/paddle and the material makes contact with a second limit switch which should turn off the electric motor. The sensor arrangement stays in this state until material falls away, that is to say material is removed or released from the silo or hopper. Under such circumstances a spring bias pulls the quadrant arm back and the motor starts to turn again and the output signal indicating material is present is removed.

A problem with this paddle level sensor arrangement is knowledge as to when the electric motor has burnt out. It will be understood if the electric motor has burnt out then there is potential for overfilling as there will be no reaction force causing movement of the quadrant arm against the limit switches. In such circumstances it is possible to provide signal logic analysis in order to determine rotation of the electric motor. Thus, if the electric motor is stationary and the quadrant arm is out of its extended position, engaging a limit switch, then material is present, but if the motor is stationary the quadrant arm is in its rest position then the electric motor is faulty.

Essentially these level sensor arrangements comprise an electromechanical device in which the electric motor and a gearbox act to provide the desired rotation of the paddle. It will be understood and as indicated above that these level sensor arrangements must operate in relatively hostile environments and therefore failure of the electric motor and in particular to gearbox is possible. This is particular so when materials flow into the vessel. It will be understood with an electric motor that a gearbox with a clutch is generally required such that if there is materials flow or shift in the opposite direction to the electric motor/gearbox rotational direction these may put excessive pressure on the clutch between the gearbox and the paddle causing failure of the gearbox motor and so possibly erroneous results with respect to level indication and defection. However, whether the motor is damaged or not there may be wear on the clutch leading to unexpected operation.

In accordance with the present invention there is provided a level sensor arrangement comprising a paddle directly driven by a stepping motor to rotate in use unless the paddle is arrested in use by reaction below a material level, the arrangement including a sensor to determine paddle rotation and the sensor providing a signal to a controller indicative of paddle rotation.

Typically, the controller is arranged to control operation of the stepping motor for rotation of the paddle. Generally the controller controls the stepping motor to adjust the speed of rotation of the paddle. Additionally, the controller is arranged to control the stepping motor to alter the direction of station of the paddle. Possibly, the controller is arranged to control the stepping motor to alter the direction of rotation of the paddle to confirm that a reaction with the material level is arresting rotation of the paddle. Potentially, the controller is arranged to control the stepping motor to alternate direction of rotation of the paddle to shake the paddle for release of material attached to the paddle. Advantageously, the controller is arranged to control the stepping motor to adjust a torque value for the stepping motor. Generally, the controller is arranged to monitor the stepping motor in order to determine stepping motor failure.

Possibly, the paddle is mounted on an arm displaceable by a reaction below the material level to engage a switch. Typically, the motor is mounted on the arm.

Generally the switch is arranged to indicate when thrown reaction between the paddle and the material level.

Possibly, the switch when thrown is arranged to terminate operation of the stepping motor.

Normally, the arm is displaceable against a bias away from engagement with the switch.

Embodiments of the present invention will now be described by way of example only, with reference to the accompanying drawings, in which.

Figure 1:
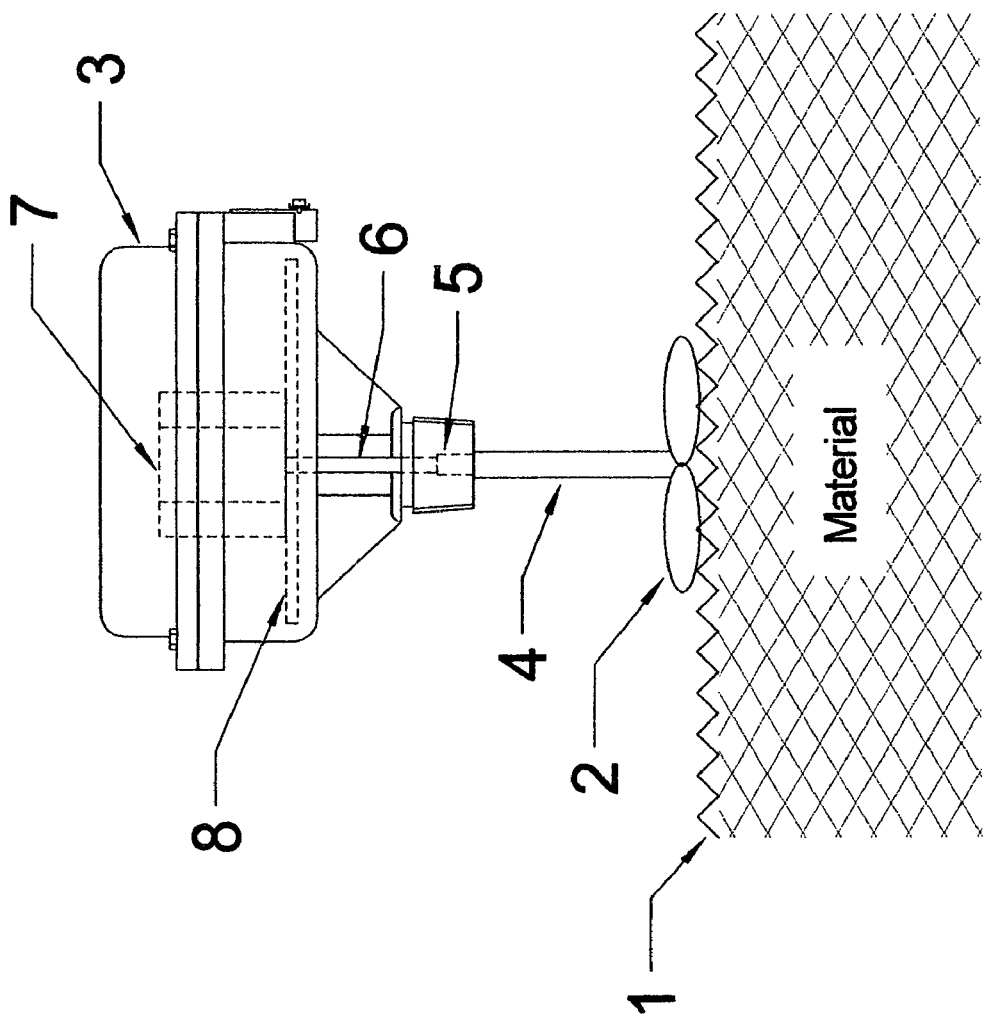
FIG. 1 is a side view of a level sensing arrangement in accordance with the present invention.

As indicated above, the paddle is rotated by a motor utilised in order to determine material levels in such vessels such as silos and hoppers. As can be seen in FIG. 1 a material level 1 within a silo may rise as material passes into the silo or other vessel until paddles 2 are submerged in the material level 1. In such circumstances the additional resistance provided by the material from which the level 1 is formed prevents rotation of the paddles 2 by reaction with the surrounding material. It is this interaction and resistance to further rotation of the paddles 2 which is utilised in order to show material level 1.

The present level sensing arrangement generally comprises a housing 3 from which the paddle 2 extends upon a shaft 4. This shaft 4 is secured upon a coupling 5. The coupling 5 in turn is coupled to a shaft 6 for an electric motor 7. The electric motor 7 is secured upon a chassis circuit board 8 in the housing 3. This chassis circuit board 8 also includes an electrical power supply and other electrical control circuitry for the motor in order to achieve the desire driving of rotation of the paddles 2 as well as determination of rotation.

In accordance with the present invention the motor 7 is a stepping or stepper motor. In such circumstances movements of the motor 7 can be individually specified, regulated and controlled through specific step instructions provided to the motor through a controller (not shown). In such circumstances through these control signals and electrical power regulation it will be understood that rotation of the shaft 7 and therefore coupling with shaft 4 to turn the paddles 2 can be similarly controlled without the need for a gearbox between the motor 7 and the drive shafts 6, 4.

Generally rotation of the paddles 2 will be in the order of one rotation per minute, but other speeds may be determined dependent upon the material from which the material level 1 is formed. Thus, for example, the material from which the level 1 is formed may comprise granular elements of differing size and density such that material at the upper level 1 may be of smaller granular size then below in some situations compared to others. In any event operation of stepping motors is generally achieved by providing electrical control signals to the motor in order to advance rotation of the motor in precise steps. These steps can be forward clockwise and reverse anticlockwise to allow the paddle 2 to rotate in different directions. Similarly, the torque value for rotation can be adjusted dependent upon electrical current supply during the pulses for stepped advancement which in terms of any level sensor arrangement allows alteration in the torque value for the arrangement dependent upon the material from which the surface 1 is formed. In such circumstances variation in torque values eliminates the need for different sized paddles to suit different types of materials. It will also be understood that the speed of rotation can be adjusted with this stepping motor dependent upon desired operational performance. It will be appreciated that the present invention simply detects rotation of the paddles by an appropriate means and therefore unlike the previous arrangement is failsafe. Stoppage of rotation will either indicate material is present or a motor failure, but in neither case an output is given in comparison with a prior arrangement comprising a simple electric motor which may burn out and secured upon a displaceable arm which may be displaced other than through engagement with a material surface.

Detection of rotation of the shaft 4 and therefore paddle 2 will generally take the form of a permanent magnet fitted to an in-board end of the shaft 6 and detected by appropriate sensors secured on the chassis printed circuit board 8.

Figure 2:
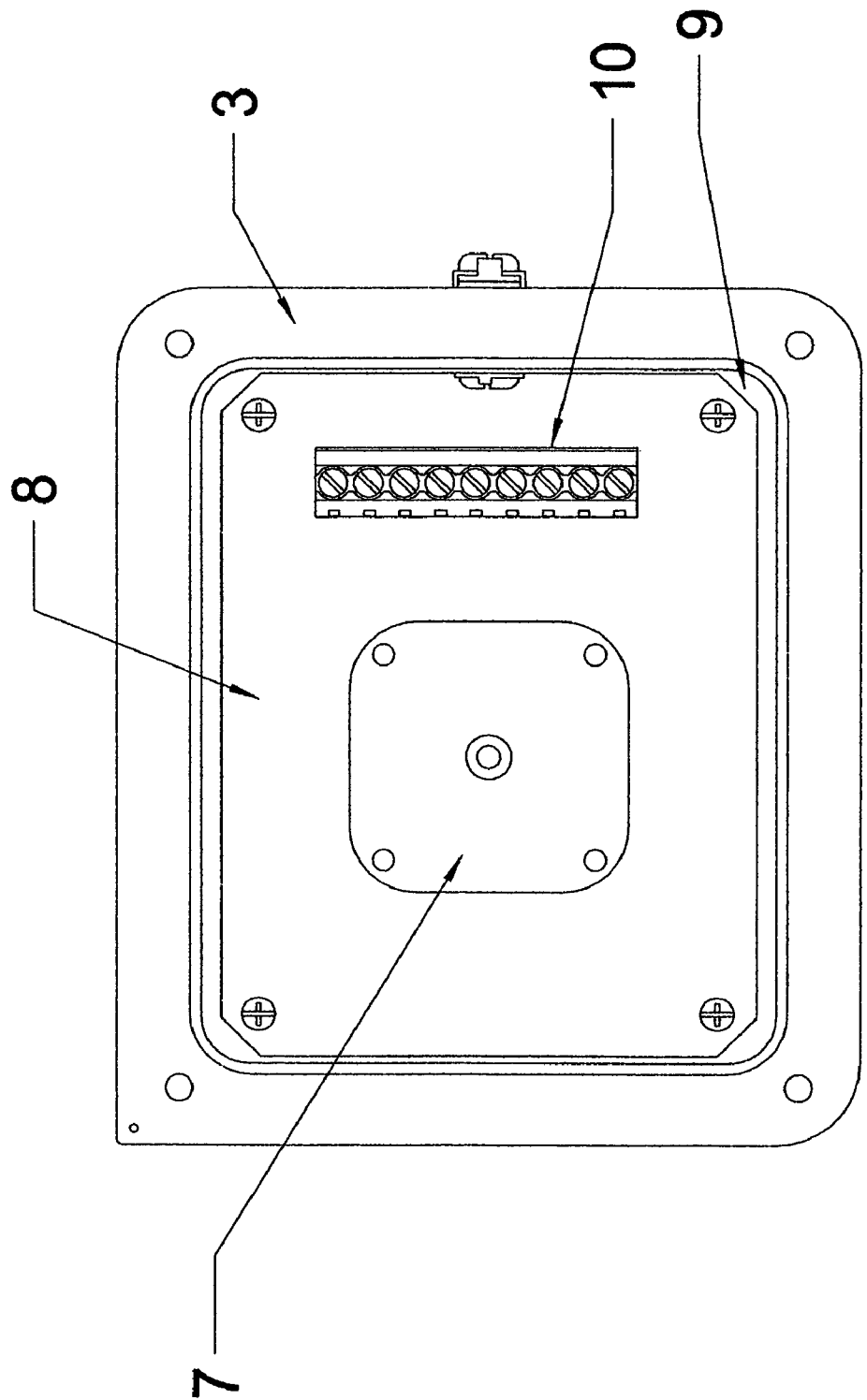
FIG. 2 is a plan view with the lid removed of the arrangement depicted in FIG. 2.

FIG. 2 illustrates a plan view of the stepper electric motor 7 secured upon the chassis printed circuit board 8 within a well 9 of the housing 3. As can be seen the motor 7 is centrally located with the remainder of the chassis printed circuit board 8 available for control circuitry. An electrical coupling 10 is provided to allow external wired communication with the level sensing arrangement. Alternatively, wireless communication between a level sensing arrangement and monitoring apparatus may be provided, but in such circumstances it will be appreciated that a battery will then be required within the arrangement rather than electrical power cabling provided through the coupling 10. It will also be understood that the level sensor arrangement may be an effective local device in which external communication is not required and simply the level sensing arrangement as indicated above incorporates a battery to drive the motor 7 and therefore the paddle 1 with the housing 3 secured within an appropriate vessel and the arrangement provided such that when the paddles 2 cease rotation an audible and/or visible alarm is raised.

It will be appreciated that as indicated generally the present level sensing arrangement will be utilised with regard it materials entering and leaving silos and hoppers. These materials are generally granular and may take the form of grain, gravel or other particulate material loaded into the silo or hopper through a chute. In such circumstances there may be a delay between the level sensor arrangement determining the level 1 rising to a point where it will interfere and eventually prevent rotation of the propellers or paddles 2. In such circumstances as can be seen in FIG. 1 the shaft 4 is generally arranged to extend downward such that the gap between the paddles 2 and the coupling 5 is sufficient to accommodate such overspill or overfilling. Alternatively, it would be appreciated that the housing 3 and the remainder of the level sensor arrangement may be outside of the vessel exposed to weathering such as rain, snow and wind. In such circumstances the arrangement as well as the seals in the arrangement should be sufficient to meet such environments.

As indicated above generally the present invention would provide an indication simply of whether the paddle 2 is rotating in terms of shaft 6 rotation. A number of different sensing techniques may be utilised with regard to determining shaft rotation, but in either event whether there is material present to form the level 1 preventing rotation against the torque value set or through failure of the motor 7, a stoppage will be indicated and appropriate remedial or monitoring action taken. However it will also be understood that more specific determination of whether the motor 7 has failed may be achieved through appropriate sensing and in such circumstances a separate fault indicating output at the coupling 10 may be provided. Furthermore, subject to space within the housing 3 it will appreciated that different fault signals may be provided dependent upon different reasons for failure of the motor or otherwise within the arrangement.

Through use of a stepping motor it will be appreciated that particular operations can be more conveniently performed in order to differentiate between materials or accommodate for the materials forming the level 1. In such circumstances where the material forming in the level 1 is sticky it will be appreciated that the paddles 2 may be rotated alternatively in different directions such that there is not a wind up in the elastic range of then material. Similarly, the paddles may be shaken by alternate rapid movements in opposite directions to remove dust or debris which may become attached to the paddles 2.

The particular capabilities of the stepping motor used in terms of number of step segments for each rotation, torque capacity and rotational speed will be dependent upon particular operational requirements. It will also be understood that generally considerations as to the cost of the stepping motor must be addressed and in terms of heat generation and ongoing power usage in use. It will be appreciated that through appropriate stepping and regenerative operation there can be considerable reductions in the necessary electrical power capacity and heat generation of the motor reducing the possibility of dangers in explosive environments such as those in a dusty grain silo.

Figure 3:
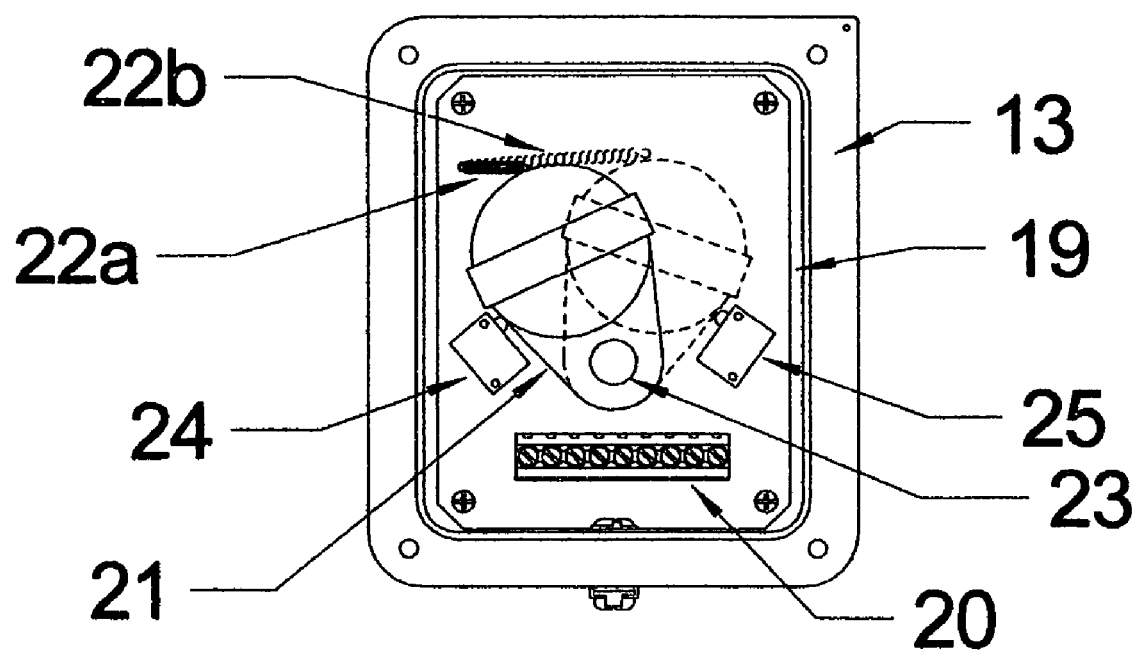
FIG. 3 is a plan view with the lid removed of an alternative embodiment of a level sensing arrangement in accordance with the present invention.

As indicated above, through use of a stepping motor it is not necessary to employ displaceable arms and engaged switching to indicate material level through reactive stopping of a paddle enveloped by an encroaching material level. It will be understood however that these approaches can be used and still utilise the torque of the motor in order to cause the displacement of the arm. FIG. 3 provides a schematic illustration of this alternative embodiment of the present invention. Thus, an electric motor 17 is arranged within a well 19 of a housing 30. The motor is a stepping motor and secured upon a quadrant arm 21 within an end of the quadrant arm secured to a spring 22 which extends from a normal position 22a to an extended position 22b. The other end of the arm 21 is secured about a pivot 23 to provide a bias towards the normal position 22a for the spring 22.

A microswitch 24 is provided in order to give an output signal indicative that the paddle is free and allowed to rotate whilst a second microswitch 25 is positioned at the other end of the arc subtended by the arm 22 when the paddle is engaged by a material level to prevent rotation of the paddles (not shown) and so through the reactive torque effect of the motor 17 causing movement about the pivot 23 between the switches 24, 25.

As previously an electrical coupling 20 is provided to enable communication of control signals from the switches 24, 25 as well as to provide power and other control features for the motor 17.

It will be appreciated that the reactive anchor force of the paddle submerged in the material level causes the motor to react against that anchor in order to cause a displacement about the arc between the switches 24, 25. In such circumstances the embodiment depicted in FIG. 3 would provide a control signal by switch 24 to supplement the notation detection sensor as described above associated with the stepping motor 17 in order to give further confirmation as to material level whilst the microswitch 25 will switch off power to the arrangement and therefore in particular the stepping motor 17 once material level has been detected. Thus the switches 24, 25 provide supplemental control signals which will be utilised within the level sensor arrangement as failsafe activators within the arrangement.

Modifications and alterations to the embodiments of the present invention described above will be appreciated by those skilled in the art. Thus, for example, a stepping motor in accordance with the present invention may be arranged to rotate until impinged by the material level and then reversed before returning to the original direction of rotation in order to confirm material level. It will be understood if the paddles can reverse when potentially the paddles have simply met an obstruction in the material raised above the general level of that material whilst if the paddles cannot move in either direction then generally material level has been achieved.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A level sensor arrangement consisting of a paddle directly driven by a direct drive stepping or stepper motor to rotate in use unless the paddle is arrested in use by a material level, the arrangement including a sensor to determine paddle rotation and the sensor providing a signal indicative of paddle rotation or arrest to a controller for controlling operation of the motor.

2. An arrangement as claimed in claim 1 wherein the controller is arranged to control operation of the motor for rotation of the paddle.

3. An arrangement as claimed in claim 1 wherein the controller controls the motor to adjust the speed for rotation of the paddle.

4. An arrangement as claimed in claim 1 wherein the controller is arranged to control the motor to alter the direction of rotation of the paddle.

5. An arrangement as claimed in claim 1 wherein the controller is arranged to control the motor to alter the direction of rotation of the paddle to confirm that a reaction with the material level is arresting rotation of the paddle.

6. An arrangement as claimed in claim 1 wherein the controller is arranged to control the motor to alternate direction of rotation of the paddle to shake the paddle for release of material attached to the paddle.

7. An arrangement as claimed in claim 1 wherein the controller is arranged to control the motor to adjust a torque value for the stepping motor.

8. An arrangement as claimed in claim 1 wherein the controller is arranged to monitor the motor in order to determine stepping motor failure.

9. An arrangement as claimed in claim l wherein the motor is mounted on an arm.

10. An arrangement as claimed in claim 9 wherein a switch is arranged to indicate, when thrown, reaction between the paddle and the material level.

11. An arrangement as claimed in claim 10 wherein the switch, when thrown, is arranged to terminate operation of the motor.

12. An arrangement as claimed in claim 11 wherein the arm is displaceable against a bias away from engagement with the switch.

* * * * *